(12) United States Patent
Yoon

(10) Patent No.: US 10,281,625 B2
(45) Date of Patent: May 7, 2019

(54) RETRO-REFLECTIVE SHEET AND METHOD FOR MANUFACTURING THE SAME

(71) Applicant: Se Won Yoon, Gyeonggi-do (KR)

(72) Inventor: Se Won Yoon, Gyeonggi-do (KR)

(73) Assignee: Se Won Yoon, Gyeonggi-do (KR)

( * ) Notice: Subject to any disclaimer, the term of this patent is extended or adjusted under 35 U.S.C. 154(b) by 73 days.

(21) Appl. No.: 15/701,123

(22) Filed: Sep. 11, 2017

(65) Prior Publication Data

US 2018/0074238 A1    Mar. 15, 2018

(30) Foreign Application Priority Data

Sep. 13, 2016 (KR) .................. 10-2016-0117845

(51) Int. Cl.

| | |
|---|---|
| *G02B 5/136* | (2006.01) |
| *B32B 27/30* | (2006.01) |
| *B32B 27/36* | (2006.01) |
| *B32B 27/40* | (2006.01) |
| *B32B 38/10* | (2006.01) |
| *G02B 5/02* | (2006.01) |
| *G02B 5/128* | (2006.01) |
| *B32B 38/00* | (2006.01) |

(52) U.S. Cl.
CPC ............ *G02B 5/136* (2013.01); *B32B 27/306* (2013.01); *B32B 27/308* (2013.01); *B32B 27/36* (2013.01); *B32B 27/40* (2013.01); *B32B 38/10* (2013.01); *G02B 5/0242* (2013.01); *G02B 5/128* (2013.01); *B32B 38/0004* (2013.01); *B32B 2307/306* (2013.01); *B32B 2307/402* (2013.01); *B32B 2307/416* (2013.01); *B32B 2307/422* (2013.01); *B32B 2309/105* (2013.01)

(58) Field of Classification Search
CPC ........ G02B 5/136; G02B 1/14; G02B 5/0242; G02B 5/128; A41D 31/0094; A41D 13/01; A41D 31/0027; A43B 1/0036; A43B 23/24; B32B 27/306; B32B 27/308; B32B 27/36; B32B 27/40; B32B 38/10; B32B 38/0004; B32B 2307/306; B32B 2307/402; B32B 2307/416; B32B 2307/422; B32B 2309/105
USPC ........................................................ 359/546
See application file for complete search history.

(56) References Cited

U.S. PATENT DOCUMENTS

| | | | |
|---|---|---|---|
| 2017/0276844 A1* | 9/2017 | McCoy ................. | G02B 5/128 |
| 2017/0293056 A1* | 10/2017 | Chen-Ho .............. | G02B 5/128 |

FOREIGN PATENT DOCUMENTS

| | | |
|---|---|---|
| JP | 2007-121517 | 5/2007 |
| JP | 2014-164082 | 9/2014 |
| KR | 100935540 | 1/2010 |

(Continued)

*Primary Examiner* — Euncha P Cherry
(74) *Attorney, Agent, or Firm* — IP & T Group LLP

(57) ABSTRACT

Disclosed are a retro-reflective sheet and a method for manufacturing the same. The retro-reflective sheet includes a heat-resistant film, a first thermoplastic bonding layer, a first heat-resistant layer, a colored layer, a light transmitting layer, a colored part allowing a portion of scattered light to be emitted to the outside through a first light condensing layer, a second thermoplastic bonding layer, a second heat-resistant layer, a reflective layer, and a reflective part reflecting light input to a reflective area through a second light condensing layer.

14 Claims, 3 Drawing Sheets

(56) References Cited

FOREIGN PATENT DOCUMENTS

| | | |
|---|---|---|
| KR | 101206376 | 11/2012 |
| KR | 101571783 | 11/2015 |

\* cited by examiner

RETRO-REFLECTIVE SHEET AND METHOD FOR MANUFACTURING THE SAME

The present application claims priority of Korean Patent Application No. 10-2016-0117845, filed on Sep. 13, 2016, which is incorporated herein by reference in its entirety.

BACKGROUND

Embodiments of the inventive concept described herein relate to a retro-reflective sheet and a method for manufacturing the same, and more particularly, to a retro-reflective body that may enhance visibility by improving light reflecting efficiency in a colored area at night, and a method for manufacturing the same.

A retro-reflective sheet is a reflective body that directly reflects incident light including a light condensing layer and a reflective layer in an incident direction. The retro-reflective sheet generally has a sheet shape, and is machined to have a desired pattern on a surface of a body of an attachment object to be attached to a road sign or a selected part of a uniform of a firefighter or the like through thermal fusion or sewing, thereby enhancing visibility such that it is easily displayed at a place, of which a surrounding environment is dark. Accordingly, if the retro-reflective sheet is attached to clothing of a person, who works on a road or at a dangerous place, such as a garbage collector, a firefighter, a policeperson, a laborer in a factory, a construction field worker, and a safety agent in the field, protection and safety of the wearer may be effectively guaranteed by allowing the surrounding people to firmly identify a location of the wearer.

Further, the retro-reflective sheet has a stripe pattern shape that alternately formed with reflective areas in which a colored area reflects light and thus may secure visibility even at night. The reflective area has a structure in which a light collecting layer is formed by attaching beads onto the reflective layer, on which metal such as aluminum is deposited, and the colored area includes a colored layer, on which an organic binder including a colored pigment having fluorescent or light accumulating characteristics is applied.

The retro-reflective sheet according to the related art is disclosed in Korean Patent No. 10-0935540 (entitled 'Retro-reflective Sheet and Method for Manufacturing the Same').

The retro-reflective sheet according to the related art includes: a base in which reflective areas RA and colored areas FA are alternately formed; a colored part including a first bonding layer formed by applying a bonding synthetic resin on an entire surface of the base, a colored layer formed by applying a bonding synthetic resin in which fluorescent pigments are mixed onto the first bonding layer, and a first light condensing layer formed by scattering a plurality of beads on the colored layer such that portions of the bodies of the beads are buried; and a reflective part including a second bonding layer formed by applying the bonding synthetic resin onto the reflective area RA on the first light condensing layer of the colored part, a reflective layer formed by depositing metal having light reflecting characteristics on the second bonding layer such that the metal has a thin film shape, a primer layer formed by applying a bonding synthetic resin having transparency characteristics onto the reflective layer, and a second light condensing layer formed by scattering a plurality of beads on the primer layer such that portions of the bodies of the beads are buried.

In this case, the colored layer may selectively include a fluorescent pigment and a fluorescent material including a fluorescent pigment, or a light accumulating pigment and a light accumulating material including a light accumulating pigment, or may include a fluorescent material and a light accumulating material together to emit light through a fluorescence operation at night or emitting light that has been accumulated by absorbing light during the day or in the interior of a building, at night, thereby enhancing visibility at night or in a dark place. Further, if the colored layer includes a fluorescent material and a light accumulating material together, it may perform a fluorescence operation and a light accumulating operation at the same time. In this case, the light emitted from the colored layer has colors such as red (R), green (G), and blue (B) according to the fluorescent material or the light accumulating material.

In this case, the quantity of light reflected from the reflective area is approximately 500 cd/lux*m$^2$, and the quantity of light reflected from the colored area is not more than 30 dc/lux*m$^2$). Accordingly, when the widths of the reflective layer and the colored layer are the same, the quantity of light reflected from the retro-reflective sheet is approximately 265 cd/lux*m$^2$.

Accordingly, because the retro-reflective sheet according to the related art reflects a small quantity of light on the colored area except for the reflective area, it decreases visibility.

SUMMARY

Embodiments of the inventive concept provide a retro-reflective sheet that may improve visibility by increasing the quantity of light reflected on a colored area at night and thus increasing the quantity of light reflected from the retro-reflective sheet.

Embodiments of the inventive concept also provide a method for manufacturing a retro-reflective sheet that may improve visibility by increasing the quantity of light reflected on a colored area at night and thus increasing the quantity of light reflected from the retro-reflective sheet.

In accordance with another aspect of the inventive concept, there is provided a retro-reflective sheet including a colored part including a light transmitting layer configured to transmit light input through a first light condensing layer of a colored area and configured to emit a portion of light obtained by scattering light that transmitted through the light transmitting layer on an interface with the light transmitting layer through the first light condensing layer together with the fluorescent or accumulated light of a colored layer, and a reflective part formed through thermal pressing on a reflective area except for the colored area on the colored part and configured to emit light input through a second light condensing layer to the outside.

In accordance with an aspect of the inventive concept, there is provided a retro-reflective sheet including a heat-resistant film, a first thermoplastic bonding layer formed on the heat-resistant film, a first heat-resistant layer formed on the first thermoplastic bonding layer, a colored layer formed on the first heat-resistant layer, a light transmitting layer formed on the colored layer, a colored part including a first light condensing layer formed on the light transmitting layer and in which a colored area is defined such that the light transmitting layer of the colored area transmits light input through the first light condensing layer and scatters the input light on an interface with the colored layer so that a portion of the scattered light is emitted to the outside through the first light condensing layer, together fluorescent light or light accumulated in the colored layer, a second thermoplastic bonding layer thermally pressed to a reflective area on the first light condensing layer to define the colored area, a second heat-resistant layer formed on the second thermoplastic bonding layer, a reflective layer formed on the second heat-resistant layer, and a reflective part including a second light condensing layer formed on the reflective layer such that the reflective layer reflects light input to the reflective area through the second light condensing layer.

In accordance with another aspect of the inventive concept, there is provided a method for manufacturing a retro-reflective sheet, the method including forming a first light condensing layer including a first bead arranging layer and a plurality of beads, on a first carrier film, forming a colored part by sequentially laminating a light transmitting layer, a colored layer, a first heat-resistant layer, a first thermoplastic bonding layer, and a first protective film, on a surface of the first light condensing layer, forming a second light condensing layer including a second bead arranging layer and a plurality of beads, on a second carrier film, forming a reflective part by sequentially laminating a reflective layer, a second heat-resistant layer, a second thermoplastic bonding layer, and a second protective film, on a surface of the second light condensing layer, separating the reflective part into a plurality of sections having a stripe pattern shape with a width of a reflective area and removing the second protective film such that the second thermoplastic bonding layer is exposed, exposing the first thermoplastic bonding layer by removing the first protective film and in turn attaching a heat-resistant film onto the first thermoplastic bonding layer, and exposing the first light condensing layer by removing a first carrier film and the first bead arranging layer such that the first light condensing layer is exposed, and thermally pressing the reflective part to the colored part while the second thermoplastic bonding layer exposed to a surface of the first light condensing layer at an interval of the colored area.

The heat-resistant film may be formed of a released heat-resistant sheet.

The colored layer may be formed of a polyurethane-based resin, an ethylene vinyl acetate (EVA) copolymer, a polyester-based resin, a meta acryl-based resin, or an acryl copolymer.

The colored layer selectively may include any one of a fluorescent material or a light accumulating material, or includes a fluorescent material and a light accumulating material together.

The light transmitting layer may be formed of $SiO_2$, indium tin oxide (ITO), tin oxide (TO), indium zinc oxide (IZO), $TiO_2$, ZnS, ZnO, Al2O3, or $CeO_2$.

The light transmitting layer may be formed of a plurality of layers of two or more of $SiO_2$, indium tin oxide (ITO), tin oxide (TO), indium zinc oxide (IZO), $TiO_2$, ZnS, ZnO, Al2O3, or $CeO_2$.

The light transmitting layer may be deposited to have a thickness of 100 to 3000 Å.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Hereinafter, the inventive concept will be described in detail with reference to the accompanying drawings.

Figure 1:
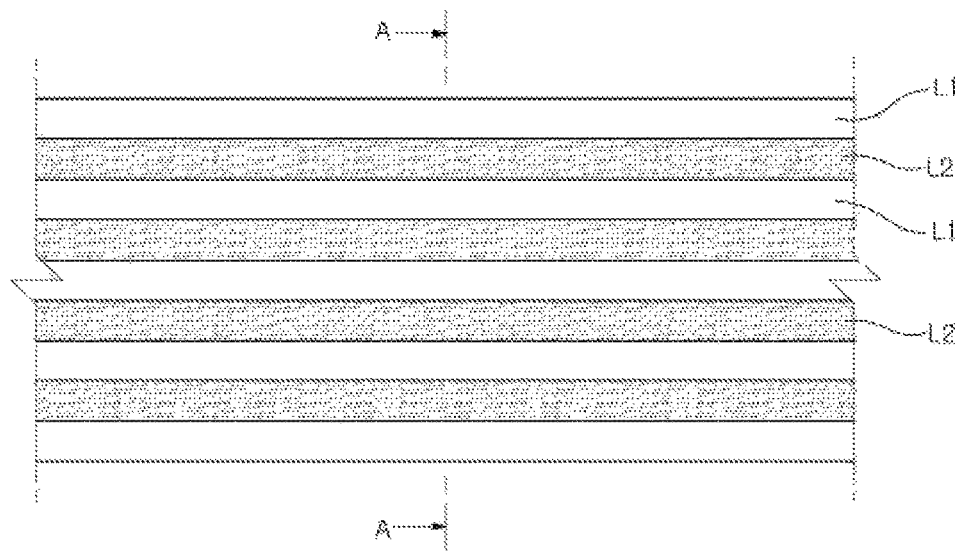
FIG. 1 is a plan view of a retro-reflective sheet according to an embodiment of the inventive concept.
Figure 2:
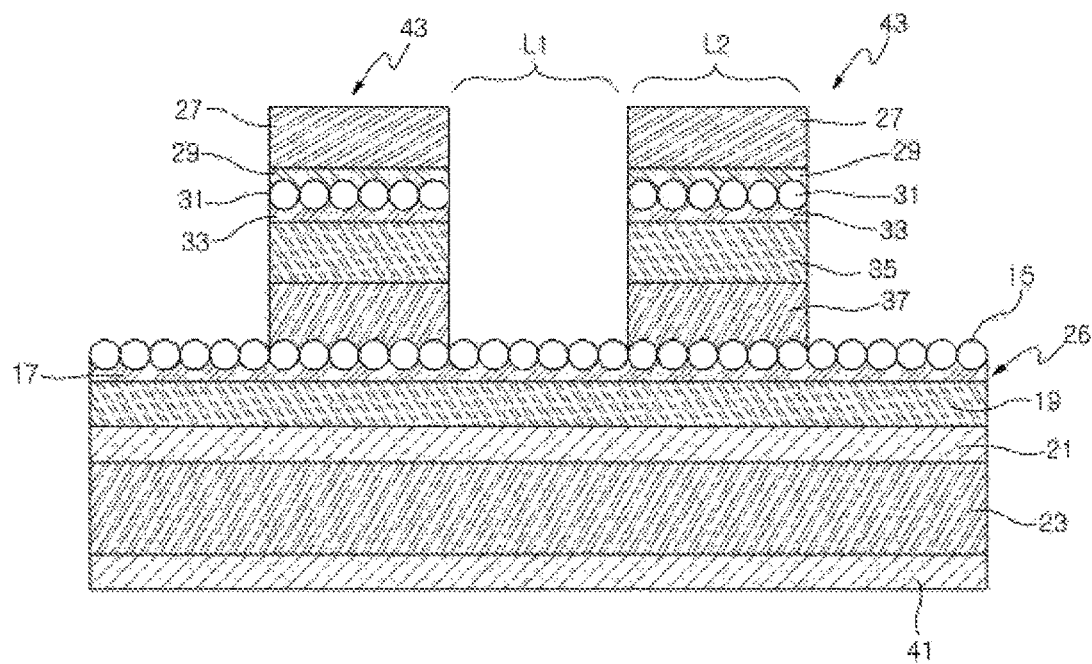
FIG. 2 is a sectional view taken along line A-A of FIG. 1.

FIG. 1 is a plan view of a retro-reflective sheet according to an embodiment of the inventive concept. FIG. 2 is a sectional view taken along line A-A of FIG. 1.

The retro-reflective sheet according to the inventive concept is formed by laminating reflective parts 43 on a colored part 26 in stripe pattern shapes such that the reflective parts 43 are spaced apart from the colored part 26 at a specific interval. Accordingly, the areas in which the reflective parts 43 are laminated define reflective areas L2, and the areas in which the reflective parts 43 are not laminated become colored areas L1.

The colored part 26 includes a heat-resistant film 41, a first thermoplastic bonding layer 23, a first heat-resistant layer 21, a colored layer 19, a light transmitting layer 17, and a first light condensing layer 15.

In this case, the heat-resistant film 41 is adapted to prevent the first thermoplastic bonding layer 23 from being contaminated, and may be formed of a heat-resistant sheet such as released PET.

The first thermoplastic bonding layer 23 is attached on a surface of a product, such as clothing or shoes, through thermal fusion, and is formed of a thermoplastic resin, such as polyester, polyurethane, polyacryl, polyolefin, thermoplastic elastomer (TPE), or thermoplastic polyurethane (TPU) to have a thickness of 300 to 500 μm.

The first heat-resistant layer 21 is formed on the first thermoplastic bonding layer 23. In this case, the first heat-resistant layer 21 includes an adhesive including a liquid synthetic resin, such as a polyurethane resin, a polyester resin, or an acryl resin, and an heat-resistant material, and is coated through a method, such as comma coating, gravure coating, micro-gravure coating, or slot die head coating to have a thickness of about 100 to 300 μm. The first heat-resistant layer 21 includes a heat-resistant material, such as aluminum hydroxide, a phosphorous-based heat-resistant material, $Sb_2O_3$, a Br-based heat-resistant material, or a melamine-based material to have heat-resistant characteristics.

The colored layer 19 is coated with a bonding synthetic resin, such as a polyurethane-based resin, an ethylene vinyl acetate (EVA) copolymer, a polyester-based resin, a meta acryl-based resin, or an acryl copolymer, through a method, such as comma coating, gravure coating, micro-gravure coating, or slot die head coating.

In this case, the colored layer 19 selectively includes any one of a fluorescent pigment and a fluorescent material including a fluorescent pigment, and a light accumulating pigment and a light accumulating material including a light accumulating pigment to have a thickness of 100 to 500 μm. Further, the colored layer 19 may include a fluorescent material and a light accumulating material together.

Therefore, the quantity of light reflected on the colored layer 19 at night or at a dark place becomes not more than 30 cd/lux*m² because the colored layer 19 emits light due to an fluorescence operation at night or absorbs light during the day or in the interior of a building to emit light at night. Further, if the colored layer 19 includes a fluorescent material and a light accumulating material together, it may perform a fluorescence operation and a light accumulating operation at the same time. In this case, the light emitted from the colored layer 19 has colors such as red (R), green (G), and blue (B) according to the fluorescent material or the light accumulating material.

The light transmitting layer 17 is formed o the colored layer 19. In this case, the light transmitting layer 17 is formed by depositing a metal having an excellent light transmittance, such as $SiO_2$, indium tin oxide (ITO), tin oxide (TO), indium zinc oxide (IZO), $TiO_2$, ZnS, ZnO, $Al2O_3$, or $CeO_2$, through a deposition method, such as evaporation, chemical vapor deposition (CVD), sputtering, or ion-beaming, to have a thickness of 100 to 3000 Å. In this case, while transmitting light input through the first light condensing layer 15, which will be described below, through a transparent thin film without shielding the light, the light transmitting layer 17 scatters the transmitted light on an interface with the colored layer 19. Accordingly, a portion of the light scattered on the interface of the light transmitting layer 17 and the colored layer 19 is emitted through the first light condensing layer 15 to the colored layer 19 together fluorescent or accumulated light. Accordingly, the quantity of the light emitted through the first light condensing layer 15 formed in the colored area L1 increases to about 200 cd/lux*$m^2$ as light reflected on the colored layer 19 and light scattered on the interface of the light transmitting layer 17 and the colored layer 19 emerge so that the visibility of the colored layer 19 is improved.

Further, the light transmitting layer 17 may include a plurality of layers including two or more of $SiO_2$, indium tin oxide (ITO), tin oxide (TO), indium zinc oxide (IZO), $TiO_2$, ZnS, ZnO, $Al2O_3$, or $CeO_2$, for example, two layers of $SiO_2$ and $TiO_2$. In this case, the reflective indexes of $SiO_2$ and $TiO_2$ that constitutes the light transmitting layer 17 have different values, for example, about 1.43 to 1.45 and about 1.7 to 1.9, respectively. Accordingly, the quantity of the light that is input through the first light condensing layer 15 and then is scattered increases on the interfaces of the plurality of layers constituting the light transmitting layer 17, for example, on the interface between an $SiO_2$ layer and a $TiO_2$ layer, as well as on the interface of the light transmitting layer 17 and the colored layer 19. Accordingly, because a portion of the scattered light is emitted through the first light condensing layer 15 together fluorescent or accumulated light, the quantity of the scattered light increases only on an interface of the light transmitting layer 17 and the colored layer 19 so that the visibility of the colored layer 19 is further enhanced. That is, if the light transmitting layer 17 includes two layers, the quantity of the light emitted through the first light condensing layer 15 increases to about 400 cd/lux*$m^2$ as light reflected on the colored layer 19, and light scattered on the interface of the light transmitting layer 17 and light scattered in the interior of the light transmitting layer 17 emerge so that the visibility of the colored layer 19 is improved.

Further, the first light collecting layer 15 is formed such that a plurality of beads are scatted on the light transmitting layer 17. In this case, the plurality of beads constituting the first light condensing layer 15 is adapted to condense incident light, and is formed of glass having sizes of 20 to 200 μm, transparent non-glass ceramic, or a transparent synthetic resin.

In this case, the first primer layer (not illustrated) may be formed between the light transmitting layer 17 and the first light condensing layer 15. The first primer layer is adapted to smoothly adhere metal during a deposition process for forming the light transmitting layer 17 in the first light condensing layer 15, and has to be transparent to prevent loss of light that is input to the light transmitting layer 17 through the first light condensing layer 15.

The reflective part 43 includes a second thermoplastic bonding layer 37, a second heat-resistant layer 35, a reflective layer 33, a second light condensing layer 31, a bead arranging layer 29, and a carrier film 27.

A lower surface of the second thermoplastic bonding layer 37 is attached on the first light condensing layer 15 of the colored part 26 such that the second thermoplastic bonding layer 37 defines a reflective area L2. In this case, a part of the colored part 26, on which the second thermoplastic bonding layer 37 is not attached, becomes a colored area L1. The second thermoplastic bonding layer 37 is attached on the first bonding layer 15, through thermal fusion, and is formed of a thermoplastic resin, such as polyester, polyurethane, polyacryl, polyolefin, thermoplastic elastomer (TPE), or thermoplastic polyurethane (TPU) to have a thickness of 300 to 500 μm like the first thermoplastic bonding layer 23.

The second heat-resistant layer 35 is formed on the second thermoplastic bonding layer 37. In this case, the second heat-resistant layer 35 includes an adhesive including a liquid synthetic resin, such as a polyurethane resin, a polyester resin, or an acryl resin, and a heat-resistant material, and is coated through a method, such as comma coating, gravure coating, micro-gravure coating, or slot die head coating to have a thickness of about 100 to 300 μm. The second heat-resistant layer 35 includes a heat-resistant material, such as aluminum hydroxide, a phosphorous-based heat-resistant material, $Sb_2O_3$, a Br-based heat-resistant material, or a melamine-based heat-resistant material to have inflammability characteristics.

The reflective layer 33 is formed by depositing a metal having excellent light reflection characteristics, such as Al, Ag, Cu, Zn, or Sn. In this case, the reflective layer 33 is adapted to reflect light input from the outside to the outside again, and may be formed in a thin film shape by depositing a metal, such as Al, Ag, Cu, Zn, or Sn, through a method such as evaporation, chemical vapor deposition (CVD), sputtering, or ion-beaming. Because the reflection characteristics of the reflective layer 33 lowers if the thickness of the reflective layer 33 is smaller than 100 Å, it is preferable that the reflective layer 33 be deposited to have a thickness of 100 to 3000 Å. In this case, the quantity of light reflected on the reflective layer 33 becomes approximately 500 cd/lux*$m^2$.

The second light condensing layer 31 is formed such that a plurality of beads are scattered to form a layer. In this case, the plurality of beads constituting the second light condensing layer 31 is adapted to condense incident light, and is formed of glass having sizes of 20 to 200 μm, transparent non-glass ceramic, or a transparent synthetic resin.

In this case, the second primer layer (not illustrated) may be formed between the reflective layer 33 and the second light condensing layer 31. The second primer layer is adapted to smoothly adhere metal during a deposition process for forming the reflective layer 33 on the second light condensing layer 31, and has to be transparent to prevent loss of light that is input to the reflective layer 33 through the second light condensing layer 31.

The bead arranging layer 29 is formed on the second light condensing layer 31. In this case, the bead arranging layer 29 is adapted to arrange a plurality of beads when the beads are scattered to constitute the second light condensing layer 31, and is formed of a thermoplastic synthetic resin, such as an ethylene vinyl acetate (EVA) copolymer, an ethylene (EAA) copolymer, polyethylene (LDPE, LLDPE, or HDPE), polypropylene, or a poly acryl copolymer. Further, the carrier film 27 is formed on the bead arranging layer 29. In this case, the carrier film 27 is formed of a synthetic resin, such as polyester.

The above-described retro-reflective sheet according to the inventive concept is attached by removing the heat-resistant film 41 and pressing the retro-reflective sheet while heat is applied to the carrier film 27 in a state in which the first thermoplastic bonding layer 23 contacts a surface of a product, such as clothing or shoes. In this case, the carrier film 27 prevents the first light condensing layer 15 from being damaged when the retro-reflective sheet is thermally pressed, and the carrier film 27 is removed together with the bead arranging layer 29 after the thermal pressing.

In this case, because the heat-resistance film 41 is formed of a heat-resistant sheet such as released PET, damage due to heat is prevented when the second thermoplastic bonding layer 37 of the reflective part 43 is mounted on the first light condensing layer 15 of the colored part 26 through thermal pressing.

Further, in the retro-reflective sheet according to the inventive concept, the light transmitting layer 17 formed in the colored area L1 transmits light that passed through the first light condensing layer 15, and the light that passed through the first light condensing layer 15 is scattered on an interface with the colored layer 19. A portion of the light is scattered on the surface of the first light condensing layer 15 and the colored layer 19 is emitted to the outside through the first light condensing layer 15 together the fluorescent light or the accumulated light. The quantity of the light emitted through the first light condensing layer 15 is obtained as a portion of the light scattered on the interface of the first light condensing layer 15 and the colored layer 19 and the fluorescent light or the light accumulated in the colored layer 19 merge, and is approximately 200 cd/lux*m².

Accordingly, in the retro-reflective sheet according to the inventive concept, the light is reflected on the reflective layer 33 of the reflective area L2 so that the quantity of light corresponding to approximately 500 cd/lux*m² is emitted through the second light condensing layer 31, and the quantity of light corresponding to 500 cd/lux*m² is emitted through the first light condensing layer 15 of the colored area L1. Accordingly, in the retro-reflective sheet according to the inventive concept, the quantity of light reflected when the widths of the reflective area L2 and the colored area L1 are the same becomes approximately 350 cd/lux*m², which is higher at night.

Further, according to the inventive concept, the light transmitting layer 17 includes a plurality of layers of two or more layers of transparent thin films so that the light is scattered on an interface between the transparent thin films as well as on an interface with the colored layer 19, and thus the quantity of light corresponding to approximately 400 cd/lux*m². Accordingly, when the light transmitting layer 17 includes two or more layers, for example, two layers and the widths of the reflective area L2 and the colored area L1 are the same, the quantity of reflected light is approximately 450 cd/lux*m² so that visibility is improved at night than when the light transmitting layer 17 includes one layer.

Table 1 represents a difference of the quantities of light of the inventive concept and the related art. The unit is cd/lux*m².

TABLE 1

|  | Related art | Light transmitting layer of one layer | Light transmitting layer of two layers |
|---|---|---|---|
| Reflective part | 500 | 500 | 500 |
| Colored part | 30 | 200 | 400 |
| Average | 255 | 350 | 450 |

As described above, although it has been described that the reflective part 43 is laminated on the colored part 26 in a stripe pattern shape to be spaced apart from the colored part 26 in the retro-reflective sheet according to the embodiment of the inventive concept, the colored part 26 may be laminated in a stripe pattern shape to be spaced apart from the reflective part 43 in another embodiment.

Further, although the colored area L1 and the reflective area L2 have stripe pattern shapes in the inventive concept, various shapes, such as waveforms or saw-tooth shapes, may be continuously formed in the lengthwise direction of the sheet.

FIGS. 3A to 3E are views of processes of manufacturing a retro-reflective sheet according to an embodiment.

Figure 3A:
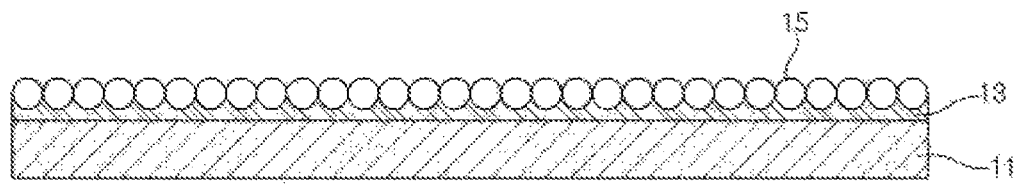
FIGS. 3A to 3E are views of processes of manufacturing a retro-reflective sheet according to an embodiment.

Referring to FIG. 3A, a first bead arranging layer 13 is formed on a first carrier film 11. In this case, the first carrier film 11 is formed of a synthetic resin, such as polyester. Further, the first bead arranging layer 13 is formed of a thermoplastic synthetic resin, such as an ethylene vinyl acetate (EVA) copolymer, an ethylene (EAA) copolymer, polyethylene (LDPE, LLDPE, or HDPE), polypropylene, or a poly acryl copolymer.

A first light condensing layer 15 is formed by scattering a plurality of beads on the first bead arranging layer 13. In this case, the first light condensing layer 15 is formed by attaching the plurality of scattered beads to only a portion of the first bead arranging layer 13, for example, a narrow area of the first bead arranging layer 13 while intermediate parts of the beads are not buried. In this case, the plurality of beads constituting the first light condensing layer 15 may be formed of glass having sizes of 20 to 200 μm, transparent non-glass ceramic, or a transparent synthetic resin.

Figure 3B:
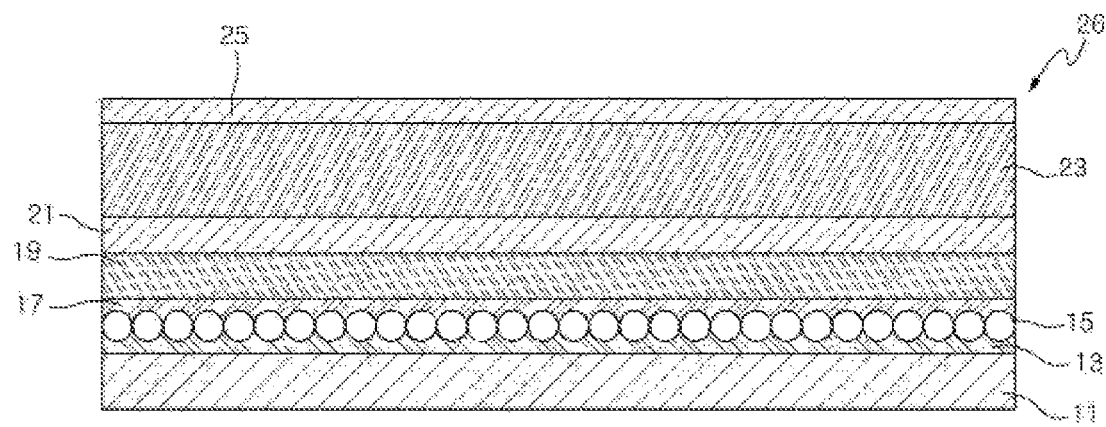

Referring to FIG. 3B, a light transmitting layer 17 is formed on a surface of the first light condensing layer 15. In this case, the light transmitting layer 17 is formed by depositing a metal having an excellent light transmittance, such as $SiO_2$, indium tin oxide (ITO), tin oxide (TO), indium zinc oxide (IZO), $TiO_2$, ZnS, ZnO, $Al_2O_3$, or $CeO_2$, through a deposition method, such as evaporation, chemical vapor deposition (CVD), sputtering, or ion-beaming, to have a thickness of 100 to 3000 Å. In this case, because the first bead arranging layer 13 is formed of a thermoplastic synthetic resin, such as an ethylene vinyl acetate (EVA) copolymer, an ethylene (EAA) copolymer, polyethylene (LDPE, LLDPE, or HDPE), polypropylene, or a poly acryl copolymer, a solvent is not volatilized when the light transmitting layer 17 is formed and thus degradation of vacuum degree may be prevented. Accordingly, the light transmitting layer 17 may be easily formed. The light transmitting layer 17 is a transparent thin film and transmits light input through the first light condensing layer 15 without shielding the light.

In this case, although the light transmitting layer 17 is formed of one layer of, for example, $SiO_2$, indium tin oxide (ITO), tin oxide (TO), indium zinc oxide (IZO), TiO2, ZnS, ZnO, Al2O3, or $CeO_2$, it may be formed of a plurality of layers of two or more of SiO2, indium tin oxide (ITO), tin oxide (TO), indium zinc oxide (IZO), TiO2, ZnS, ZnO, Al2O3, or $CeO_2$, for example, two layers of $SiO_2$ and $TiO_2$ in the inventive concept.

In this case, because the reflective indexes of $SiO_2$ and $TiO_2$ constituting the light transmitting layer 17 have different values, for example, approximately 1.43 to 1.45 and approximately 1.7 to 1.9, respectively, the quantity of the light that is input through the first light condensing layer 15 and scattered light increases even on the interfaces of the plurality of layers if the light transmitting layer 17 has a plurality of layers.

Further, a first primer layer (not illustrated) may be formed first before the light transmitting layer 17 is formed on a surface of the first light condensing layer 15. In this case, the first primer layer is adapted to smoothly adhere metal during a deposition process for forming the light transmitting layer 17 on surfaces of the plurality of beads, and has to be transparent to prevent loss of light that is input to the light transmitting layer 17 through the first light condensing layer 15.

Further, a colored layer 19 is formed on the light transmitting layer 17. In this case, the colored layer 19 is coated with a bonding synthetic resin, such as a polyurethane-based resin, an ethylene vinyl acetate (EVA) copolymer, a polyester-based resin, a meta acryl-based resin, or an acryl copolymer, which includes a fluorescent or accumulated pigment, through a method, such as comma coating, gravure coating, micro-gravure coating, or slot die head coating so that the colored layer 19 has a thickness of approximately 100 to 500 μm. In this case, the colored layer 19 selectively includes any one of a fluorescent pigment and a fluorescent material including a fluorescent pigment, and a light accumulating pigment and a light accumulating material including a light accumulating pigment. Further, the colored layer 19 may include a fluorescent material and a light accumulating material together.

Further, a first heat-resistant layer 21 is formed on the colored layer 19. In this case, the first heat-resistant 21 includes an adhesive including a liquid synthetic resin, such as a polyurethane resin, a polyester resin, or an acryl resin, and a heat-resistant material, and is coated through a method, such as comma coating, gravure coating, micro-gravure coating, or slot die head coating to have a thickness of about 100 to 300 μm. In this case, the first heat-resistant layer 21 includes a heat-resistant material, such as aluminum hydroxide, a phosphorous-based heat-resistant material, $Sb_2O_3$, a Br-based heat-resistant material, or a melamine-based heat-resistant material to have heat-resistant characteristics.

Next, the first thermoplastic bonding layer 23 is formed on the first heat-resistant layer 21. In this case, the first thermoplastic bonding layer 23 is adapted to attach the manufactured retro-reflective sheet onto a surface of a product, such as clothing or shoes, through thermal fusion, and is a sheet formed of a thermoplastic resin, such as polyester, polyurethane, polyacryl, polyolefin, thermoplastic elastomer (TPE), or thermoplastic polyurethane (TPU) to have a thickness of 300 to 500 μm.

Further, a first protective film 25 is formed on the first thermoplastic bonding layer 23. In this case, the first protective film 25 is formed of a polyolefin film to prevent the first thermoplastic bonding layer 23 from being contaminated.

Figure 3C:
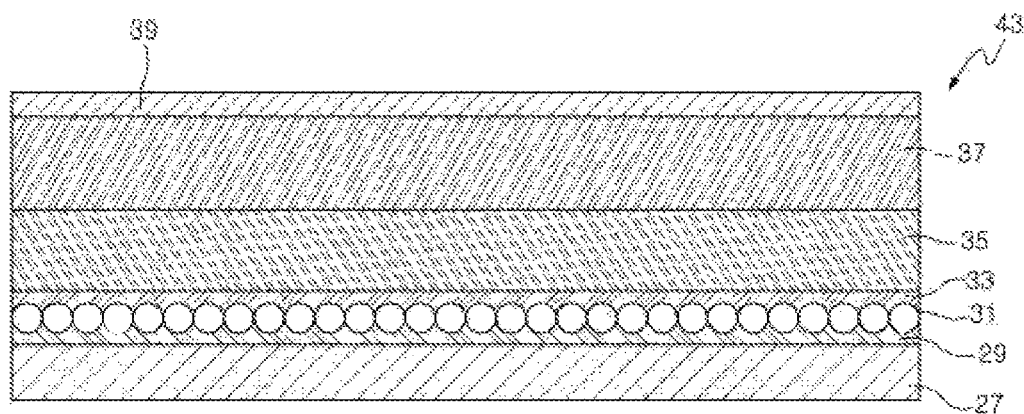

Referring to FIG. 3C, as illustrated in FIG. 3A, a second bead arranging layer 29 and a second light condensing layer 31 are sequentially formed on the second carrier film 27. In this case, the second carrier film 27 is formed of a synthetic resin, such as polyester, like the first carrier film 11, and the second bead arranging layer 29 is formed of a thermoplastic synthetic resin, such as such as an ethylene vinyl acetate (EVA) copolymer, an ethylene (EAA) copolymer, polyethylene (LDPE, LLDPE, or HDPE), polypropylene, or a poly acryl copolymer, like the first bead arranging layer 13. In this case, the second carrier film 27 and the second bead arranging layer 29 are the same as the carrier film 27 and the bead arranging layer illustrated in FIG. 1.

Further, the second light condensing layer 31 is formed by scattering a plurality of beads on the second bead arranging layer 29 like the first light condensing layer 15. In this case, the second light condensing layer 31 may be formed on the second bead arranging layer 29 like the first light condensing layer 15. In this case, the plurality of beads constituting the second light condensing layer 31 may be formed of glass having sizes of 20 to 200 μm, transparent non-glass ceramic, or a transparent synthetic resin.

Next, a reflective layer 33 is formed on a surface of the second light condensing layer 31. The reflective layer 33 is formed by depositing a metal having excellent light reflection characteristics, such as Al, Ag, Cu, Zn, or Sn, through a method, such as evaporation, chemical vapor deposition (CVD), sputtering, or ion-beaming. In this case, the reflective layer 33 is adapted to reflect the light input from the outside to the outside again, and because the reflection characteristics of the reflective layer 33 lowers if the thickness of the reflective layer 33 is smaller than 100 Å, it is preferable that the reflective layer 33 be deposited to have a thickness of 100 to 3000 Å. In this case, because the second bead arranging layer 29 is formed of a thermoplastic synthetic resin, such as an ethylene vinyl acetate (EVA) copolymer, an ethylene (EAA) copolymer, polyethylene (LDPE, LLDPE, or HDPE), polypropylene, or a poly acryl copolymer, like the first bead arranging layer 13, a solvent is not volatilized when the reflective layer 33 is formed and thus degradation of vacuum degree may be prevented. Accordingly, the reflective layer 33 may be easily formed.

In this case, a second primer layer (not illustrated) may be formed first before the reflective layer 33 is formed on a surface of the second light condensing layer 31. In this case, the second primer layer is adapted to smoothly adhere metal during a deposition process for forming the reflective layer 33 on the surfaces of the plurality of beads, and has to be transparent to prevent loss of light that is input to the reflective layer 33 through the second light condensing layer 31.

Further, a second heat-resistant layer 35 is formed on the reflective layer 33. In this case, the second heat-resistant layer 35 includes an adhesive including a liquid synthetic resin, such as a polyurethane resin, a polyester resin, or an acryl resin, and an heat-resistant material, and is formed through a method, such as comma coating, gravure coating, micro-gravure coating, or slot die head coating to have a thickness of about 100 to 300 μm, like the first heat-resistant layer 21.

Next, the second thermoplastic bonding layer 37 is formed on the second heat-resistant layer 35. In this case, the second thermoplastic bonding layer 37 is adapted to attach the manufactured retro-reflective sheet onto a surface of a product, such as clothing or shoes, through thermal fusion, and is a sheet formed of a thermoplastic resin, such as polyester, polyurethane, polyacryl, polyolefin, thermoplastic elastomer (TPE), or thermoplastic polyurethane (TPU) to have a thickness of 300 to 500 μm, like the first thermoplastic bonding layer 23.

Further, the manufacturing of the reflective part 43 is completed by forming a second protective film 39 on the second thermoplastic bonding layer 37. In this case, the second protective film 39 is formed of a polyolefin film to prevent the first thermoplastic bonding layer 37 from being contaminated, like the first protective film 25.

Figure 3D:
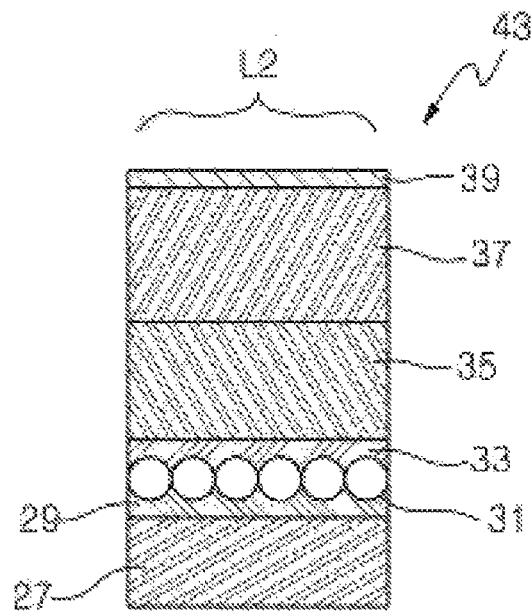

Referring to FIG. 3D, the reflective part 43 is separated into a plurality of sections in a stripe pattern shape in a cutting method to have a width of a reflective area L2.

Figure 3E:
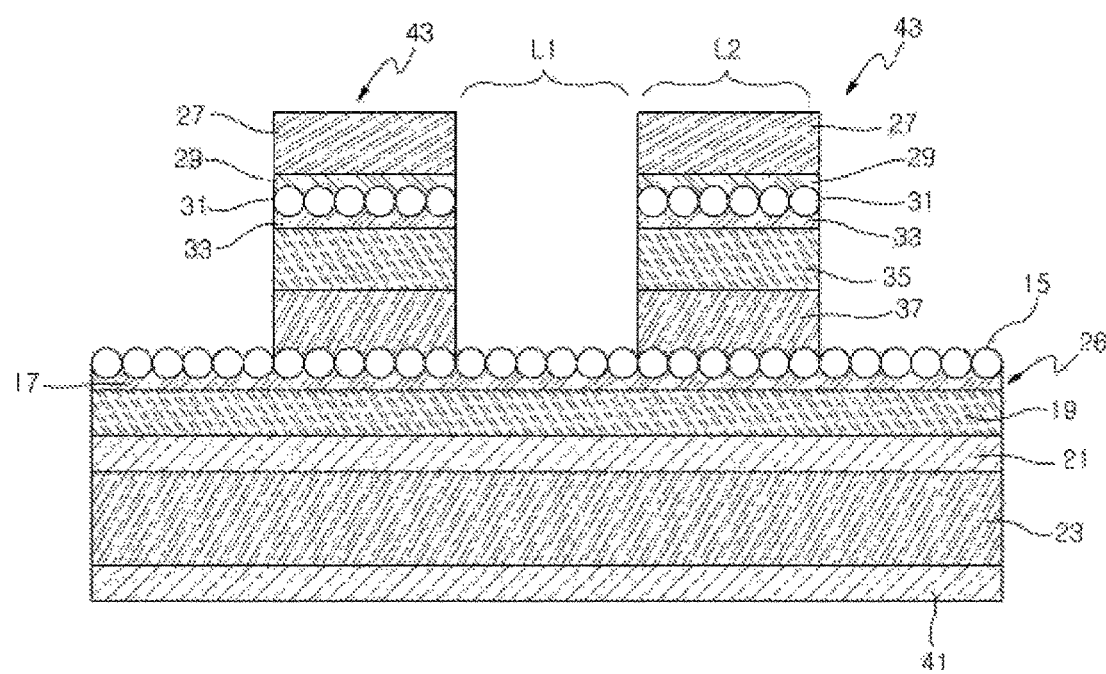

Referring to FIG. 3E, the second thermoplastic bonding layer 37 is exposed by removing the second protective film 39 of the reflective part 43 separated into a plurality of sections.

Further, the first thermoplastic bonding layer 23 is exposed by removing the first protective film 25 of the colored part 26. In this case, because the polyolefin film constituting the first protective film 25 is vulnerable to heat, it may be damaged by heat during the thermal pressing and thus is removed. Further, a heat-resistant film 41 is attached on the exposed surface of the first thermoplastic bonding layer 23. The heat-resistant film 41 is formed of a heat-resistant sheet, such as released PET.

Further, the first carrier film 11 is removed. Then, the first bead arranging layer 13 is also removed together with the first carrier film 11 such that the first light condensing layer 15 is exposed.

The reflective part 43 is mounted on the colored part 26 by thermally pressing the second thermoplastic bonding layer 37 of the reflective part 43 onto the exposed first light condensing layer 15 of the colored part 26 such that the second thermoplastic bonding layer 37 has a specific interval, for example, an interval of the colored area L1. The thermal pressing is performed by applying a pressure together with heat to the second carrier film 27 to prevent the plurality of beads constituting the second light condensing layer 16 from being damaged. Further, because the heat-resistant film 41 under the colored part 26 is formed of a heat-resistant sheet, such as released PED, the damage by heat is prevented during the thermal pressing. In this case, an area in which the reflective part 43 having a stripe pattern shape is bonded on the first light condensing layer 17 of the colored part 26 becomes the reflective area 12, and an area in which the reflective part 43 is not bonded to the first light condensing layer 17 and the first light condensing layer 17 is exposed becomes the colored area L1.

As described above, although it has been described that the reflective part 43 is laminated on the colored part 26 in a stripe pattern shape to be spaced apart from the colored part 26 in the method for manufacturing a retro-reflective sheet according to the embodiment of the inventive concept, the colored part 26 may be laminated in a stripe pattern shape to be spaced apart from the reflective part 43 in another embodiment.

Therefore, according to the inventive concept, visibility may be improved by increasing the quantity of light reflected on a colored area at night and thus increasing the quantity of light reflected from the whole retro-reflective sheet.

It will be noted by those skilled in the art to which the inventive concept pertains that the inventive concept is not limited by the above-described embodiments and the accompanying drawings but may be variously substituted, modified, and changed without departing from the spirit of the inventive concept.

What is claimed is:

1. A retro-reflective sheet comprising:
   a heat-resistant film;
   a first thermoplastic bonding layer formed on the heat-resistant film;
   a first heat-resistant layer formed on the first thermoplastic bonding layer;
   a colored layer formed on the first heat-resistant layer;
   a light transmitting layer formed on the colored layer;
   a colored part including a first light condensing layer formed on the light transmitting layer and in which a colored area is defined such that the light transmitting layer of the colored area transmits light input through the first light condensing layer and scatters the input light on an interface with the colored layer so that a portion of the scattered light is emitted to the outside through the first light condensing layer, together fluorescent light or light accumulated in the colored layer;
   a second thermoplastic bonding layer thermally pressed to a reflective area on the first light condensing layer to define the colored area;
   a second heat-resistant layer formed on the second thermoplastic bonding layer;
   a reflective layer formed on the second heat-resistant layer; and
   a reflective part including a second light condensing layer formed on the reflective layer such that the reflective layer reflects light input to the reflective area through the second light condensing layer.

2. The retro-reflective sheet of claim 1, wherein the heat-resistant film is formed of a released heat-resistant sheet.

3. The retro-reflective sheet of claim 1, wherein the colored layer is formed of a polyurethane-based resin, an ethylene vinyl acetate (EVA) copolymer, a polyester-based resin, a meta acryl-based resin, or an acryl copolymer.

4. The retro-reflective sheet of claim 1, wherein the colored layer selectively includes any one of a fluorescent material or a light accumulating material, or includes a fluorescent material and a light accumulating material together.

5. The retro-reflective sheet of claim 1, wherein the light transmitting layer is formed of $SiO_2$, indium tin oxide (ITO), tin oxide (TO), indium zinc oxide (IZO), $TiO_2$, ZnS, ZnO, $Al2O_3$, or $CeO_2$.

6. The retro-reflective sheet of claim 1, wherein the light transmitting layer is formed of a plurality of layers of two or more of $SiO_2$, indium tin oxide (ITO), tin oxide (TO), indium zinc oxide (IZO), $TiO_2$, ZnS, ZnO, $Al2O_3$, or $CeO_2$.

7. The retro-reflective sheet of claim 1, wherein the light transmitting layer is deposited to have a thickness of 100 to 3000 Å.

8. A method for manufacturing a retro-reflective sheet, the method comprising:
   forming a first light condensing layer including a first bead arranging layer and a plurality of beads, on a first carrier film;
   forming a colored part by sequentially laminating a light transmitting layer, a colored layer, a first heat-resistant layer, a first thermoplastic bonding layer, and a first protective film, on a surface of the first light condensing layer;
   forming a second light condensing layer including a second bead arranging layer and a plurality of beads, on a second carrier film;
   forming a reflective part by sequentially laminating a reflective layer, a second heat-resistant layer, a second thermoplastic bonding layer, and a second protective film, on a surface of the second light condensing layer;
   separating the reflective part into a plurality of sections having a stripe pattern shape with a width of a reflective area and removing the second protective film such that the second thermoplastic bonding layer is exposed;

exposing the first thermoplastic bonding layer by removing the first protective film and in turn attaching a heat-resistant film onto the first thermoplastic bonding layer; and exposing the first light condensing layer by removing a first carrier film and the first bead arranging layer such that the first light condensing layer is exposed, and thermally pressing the reflective part to the colored part while the second thermoplastic bonding layer exposed to a surface of the first light condensing layer at an interval of the colored area.

9. The method of claim 8, wherein the heat-resistant film is formed of a released heat-resistant sheet.

10. The method of claim 8, wherein the colored layer is formed of a polyurethane-based resin, an ethylene vinyl acetate (EVA) copolymer, a polyester-based resin, a meta acryl-based resin, or an acryl copolymer.

11. The method of claim 8, wherein the colored layer selectively includes any one of a fluorescent material or a light accumulating material, or includes a fluorescent material and a light accumulating material together.

12. The method of claim 8, wherein the light transmitting layer is formed of $SiO_2$, indium tin oxide (ITO), tin oxide (TO), indium zinc oxide (IZO), $TiO_2$, ZnS, ZnO, $Al2O_3$, or $CeO_2$.

13. The method of claim 8, wherein the light transmitting layer is formed of a plurality of layers of two or more of $SiO_2$, indium tin oxide (ITO), tin oxide (TO), indium zinc oxide (IZO), $TiO_2$, ZnS, ZnO, $Al2O_3$, or $CeO_2$.

14. The method of claim 8, wherein the light transmitting layer is deposited to have a thickness of 100 to 3000 Å.

* * * * *